US006674802B2

(12) United States Patent
Knee et al.

(10) Patent No.: US 6,674,802 B2
(45) Date of Patent: *Jan. 6, 2004

(54) VIDEO PROCESS WHERE PART OF COMPRESSED VERSION OF VIDEO SIGNAL ACCOMPANIES VIDEO SIGNAL ITSELF

(75) Inventors: Michael James Knee, Petersfield (GB); Nicholas Dominic Wells, Brighton (GB)

(73) Assignees: Snell & Wilcox Limited, St. Margaret's Twickenham (GB); British Broadcasting Corporation, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,897

(22) PCT Filed: Jul. 10, 1997

(86) PCT No.: PCT/GB97/01862
§ 371 (c)(1),
(2), (4) Date: Aug. 26, 1999

(87) PCT Pub. No.: WO98/03017
PCT Pub. Date: Jan. 22, 1998

(65) Prior Publication Data
US 2002/0118760 A1 Aug. 29, 2002

(30) Foreign Application Priority Data
Jul. 15, 1996 (GB) .............................................. 9614860
Mar. 21, 1997 (GB) .............................................. 9705963

(51) Int. Cl.[7] ................................................ H04N 7/12
(52) U.S. Cl. ................................................ 375/240.26
(58) Field of Search ..................... 375/240.26, 240.25, 375/240.29; 348/425.1, 423.1; 370/263, 265, 270

(56) References Cited

U.S. PATENT DOCUMENTS

| 5,969,768 A | * 10/1999 | Boyce et al. ............... 348/565 |
| 6,141,059 A | * 10/2000 | Boyce et al. ............ 375/240.26 |
| 6,160,844 A | * 12/2000 | Wilkinson ............. 375/240.01 |
| 6,584,077 B1 | * 6/2003 | Polomski ................. 370/263 |

FOREIGN PATENT DOCUMENTS

| EP | 0 627 854 | 12/1994 | ............ H04N/5/92 |
| EP | 0 656 729 | 6/1995 | ............ H04N/7/58 |
| EP | 0 694 921 | 1/1996 | ........... H04N/5/926 |
| EP | 0 707 426 | 4/1996 | ............ H04N/7/26 |
| JP | 63 176049 | 7/1988 | ............ H04L/23/00 |
| JP | 03 057382 | 3/1991 | ............ H04N/7/87 |
| JP | 04 304094 | 10/1992 | ............ H04N/9/79 |
| WO | WO 94 10771 | 5/1994 | ............ H04H/1/00 |
| WO | WO 95 35628 | 12/1995 | ............ H04N/7/26 |

OTHER PUBLICATIONS

Safranek et al., "Methods for matching compressed video to ATM networks", Proceedings., International Conference on Image Processing, vol. 1, pp. 13–16, Oct. 1995.*
Mitra & Kaiser, Handbook for Digital Signal Processing, Wiley, 1993, pp. 421–425.

* cited by examiner

Primary Examiner—Vu Le
(74) Attorney, Agent, or Firm—McDermott, Will & Emery

(57) ABSTRACT

After decoding of an MPEG bitstream to the form of a video signal, an information stream signal in the form of all or part of the MPEG bitstream, is transmitted alongside the video signal, embedded in the least significant bit. Recording may simply involve extraction of the embedded MPEG bitstream or, if only part of the bitstream has been embedded, an essentially "dumb" coding operation guided by the information stream signal.

24 Claims, 3 Drawing Sheets

VIDEO PROCESS WHERE PART OF COMPRESSED VERSION OF VIDEO SIGNAL ACCOMPANIES VIDEO SIGNAL ITSELF

The invention relates to video signal compression.

In an important example, the invention concerns the MPEG-2 video signal compression standard, ISO/IEC 13818-2, though it can be applied to any video compression system that is liable to degradation when coding and decoding are cascaded.

There has already been disclosed (WO-A-9535628) the use of a signal which accompanies an MPEG bitstream and which carries information about the bitstream for use in a downstream process, for example, the re-encoding of a decoded MPEG picture. This signal is provided in parallel and is sent along an appropriate side channel to accompany a decompressed signal from a compression decoder to a subsequent encoder.

Where equipment has been specifically designed for use with such a signal, considerable advantage can be gained and many of the problems previously associated with cascaded coding and decoding processes are removed or ameliorated by using in a downstream coding process, key information concerning upstream coding and decoding.

It is an object of the present invention to extend these advantages, in part or in whole, to arrangements which include equipment not specifically designed for use with such a signal.

Accordingly, the present invention consists in one aspect in a video signal process wherein a compression encoded signal is compression decoded for passage along a video pathway, characterised in that the compression encoded signal or a portion thereof, accompanies the video signal along the video pathway.

Suitably, said portion of the compression encoded signal comprises a compressed form of the information bus as detailed in the above mentioned WO-A-9535628. This Information Bus may include the following information: picture dimensions; frame rate; picture structure (frame-coded or field-coded); picture type (I,P or B); whether macroblocks are intra-coded or use prediction; whether forward, backward or bi-directional prediction is used; motion vectors; quantiser visibility weighting matrices; quantiser step and buffer state of a downstream decoder.

In a further aspect, the present invention consists in the transport along a video pathway of a signal, containing all or part of an MPEG bitstream, alongside a video signal decoded from the MPEG bitstream.

In one form of the invention, said signal is MPEG compliant.

The advantage of such an arrangement is that bitstream information can pass transparently through studio processing equipment to facilitate re-encoding of the output to MPEG format without impairments due to cascading. For the purposes of this specification, the new signal is called the Information Stream.

The invention will now be described by way of example with reference to the accompanying drawings, in which FIG. 1 is a block diagram of a studio installation that makes use of the Information Stream;

Figure 1:
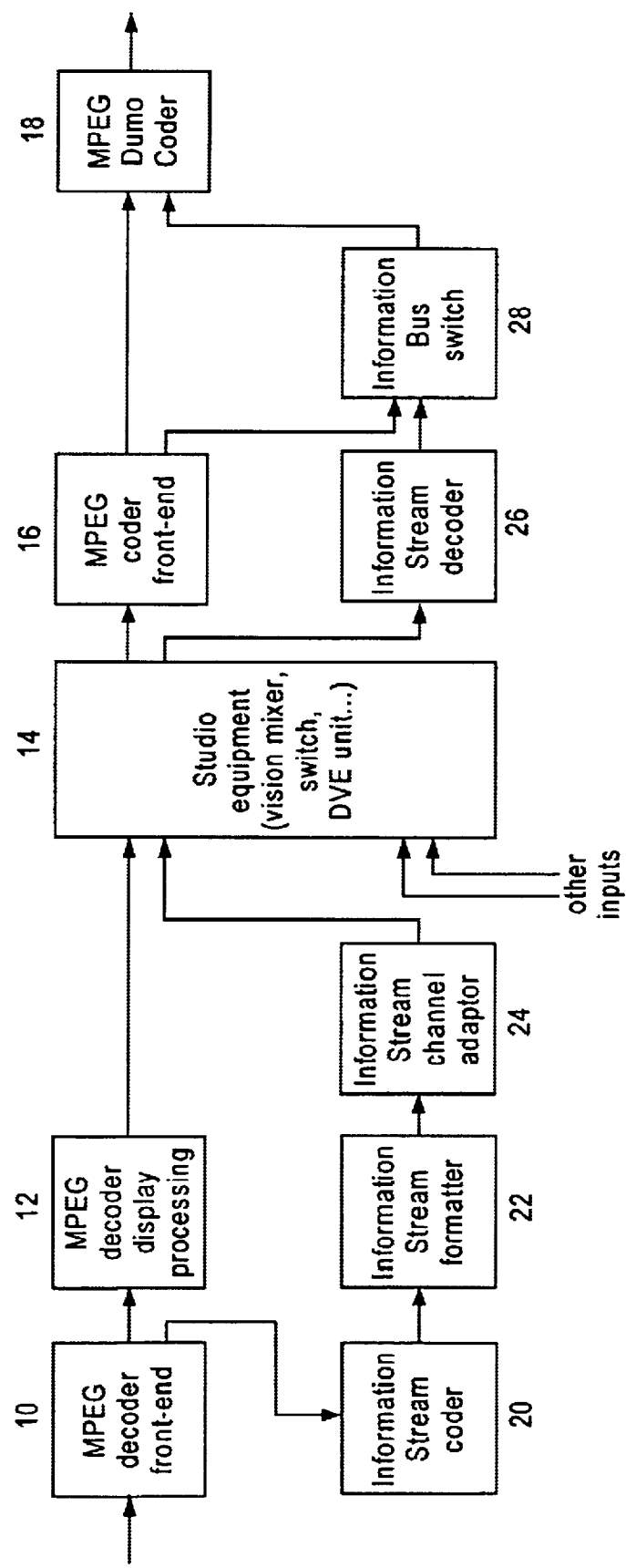

Referring initially to FIG. 1, the installation has MPEG bitstreams at its input and output but uses 'conventional' studio processing equipment working on uncompressed video signals. This block diagram can be viewed in two parts: the main signal path that runs along the top of the diagram, and the Information Stream path that runs along the bottom.

In the main signal path, an MPEG bitstream enters an MPEG decoder front-end 10 which produces DCT coefficients and an Information Bus. These are processed further by the MPEG decoder display processing block 12 to produce an ITU-R Rec. 656 video signal for the studio equipment shown at 14. This equipment may comprise, for example, a vision mixer, a simple switch or a DVE machine. The output of the studio equipment 14 is analysed by an MPEG coder front-end 16 which passes a suitably formatted picture signal and an Information Bus to an MPEG coder 18. As it stands, this configuration necessitates a full MPEG re-coding operation at the output of the studio equipment, an operation which will introduce impairments due to cascading.

The problem of impairments due to cascading is overcome by the addition of the Information Stream path, the various stages of which are provided by the present invention. The DCT coefficients and Information Bus are processed in an Information Stream coder 20, which produces one of a variety of Information Stream signals, as will be described in more detail below, Formatting of the Information Stream is performed by an Information Stream formatter 22 and the resulting bitstream is encoded by an Information Stream channel adapter 24 so that it can pass through the studio equipment 14 together with the decoded video signal. At the output of the studio equipment, the Information Stream is decoded by an Information Stream decoder 26, typically to an Information Bus that is compatible and synchronous with the Information Bus produced by the MPEG coder front-end 16. An Information Bus switch 28 then selects between the newly calculated Information Bus and the Information Bus decoded from the Information Stream. The selected Information Bus is then used as the basis for re-encoding to an MPEG bitstream.

The MPEG coder front-end 16, the Information Bus switch 28 and the MPEG dumb coder 18 together constitute an Information Stream-based MPEG coder. Note that the bit-rate of the MPEG bitstream at the output of this coder is not constrained to be the same as that of the original MPEG signal.

Typically, the Information Stream path is used whenever the studio equipment has passed the Information Stream transparently. This would happen, for example, when the slider switch in a vision mixer is set to select one or other of the inputs in full. At other times, for example, when the slider is in an intermediate position, the Information Stream passing through the studio equipment is corrupted and cannot be used, and the picture information is such that new MPEG coding decisions need to be made in any case.

Figure 2:
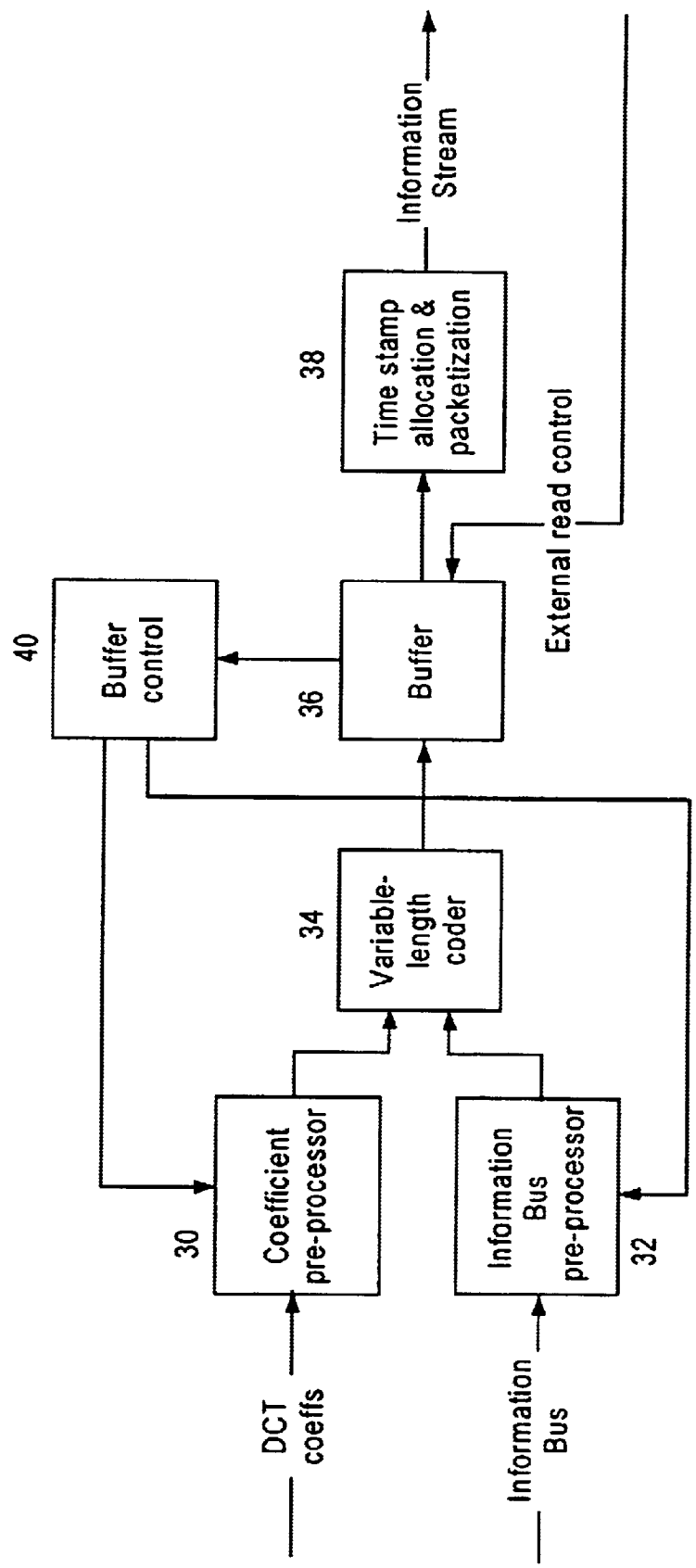
FIG. 2 is a block diagram of an Information Stream coder.

Turning now to FIG. 2, there is illustrated an Information Stream coder.

The DCT coefficients and the Information Bus are received, respectively by a coefficient pre-processor 30 and an Information Bus pre-processor 32. The two pre-processor outputs are taken to a variable length coder 34, the output of which passes through a buffer 36 to a time stamp allocation and packetisation unit 38 to produce the Information Stream output. The buffer 36 receives an external read control signal. The occupancy of the buffer 36 is monitored by a buffer control unit 40 which serves to control the pre-processors 30 and 32.

The Information Stream coder is very much like the back end of an MPEG coder. The main difference is that the buffer control may be used in different ways to limit the bit-rate of the Information Stream. Reading from the buffer may also—as mentioned—be controlled externally.

Examples of signals that could constitute an Information Stream are:

i) The MPEG bitstream itself, either in the form of an Elementary Stream or a Packetised Elementary Stream. In this case, the MPEG decoder front end and the Information Stream coder would be bypassed and the input bitstream used directly, possibly via a delay.

ii) The MPEG bitstream modified by removing or altering DCT coefficients in order to limit the bit-rate to the capacity of the chosen transport method, by means of the coefficient pre-processor as shown in FIG. 2.

iii) The MPEG bitstream modified by removing all the DCT coefficients. This is, in effect, a compressed version of the Information Bus, using the MPEG syntax as the compression method. If the bit rate available for the Information Stream is very low, it may be necessary in extreme circumstances to remove less essential elements from the bitstream by means of the Information Bus pre-processor as shown in FIG. 2.

iv) The Information Bus itself.

There are various possibilities for the format of an Information Stream signal, according to its timing relationship with the video signal it accompanies. Formatting is carried out by the Information Stream formatter 22 of FIG. 1. Examples of possible formats for the Information Stream signal are as follows:

i) A fixed-bit-rate signal but containing a variable number of bits per picture and transmitted with no regard for synchronisation to the video signal. In practice, the Information Stream could have a variable bit-rate but could be made to occupy a fixed-bit-rate channel by the use of stuffing bits ii) A fixed or variable-bit-rate signal which is re-ordered (from bitstream order to display order within the GOP structure) and time-shifted so that the Information Stream for each picture is co-timed with the video signal for that picture.

iii) A mixture of the two, in that the Information Stream itself is asynchronous but a small slot is reserved for some picture-locked data; this would carry, for example, duplicates of time_code and picture_type.

iv) A fixed-bit-rate signal which is re-ordered and time-shifted as described in the second option above, but additionally arranged so that the macro-rate information for each macroblock is co-timed with the video signal corresponding to the macroblock.

A number of ways have been identified in which the Information Stream might be transported along with a digital video signal. The Information Stream channel adapter of FIG. 1 is responsible for this task. Examples are as follows:

i) In the least significant bit of the colour-difference part of a 10-bit ITU-R Rec. 656 signal, within the active video region only. This provides a raw bit-rate of 10.368 Mbit/s for the Information Stream. Care will be taken to ensure that the presence of the Information Stream does not cause visible impairments to the video signal and that studio equipment quoted as '10 bits' is indeed transparent to all ten bits of the signal when no mixing or other processing is being performed. This option for the transport of the Information Stream is thought to be particularly ingenious. In other implementations, the Information Stream might be transported in the 9th or 8th colour-difference bit, in the 10th, 9th or 8th luminance bit or in any combination of the above. Use of the 8th bit would also be appropriate for systems using earlier versions of the Rec. 656 standard where only 8-bit representation is available.

ii) An extension of the above approach, in which any part of the digital video signal (not just the least significant bit) is modified by adding Information Stream data in such a way that a downstream MPEG coder would be unaffected.

iii) In the ancillary data channel carried in the blanking periods of the Rec. 656 signal. It would be necessary to ensure that studio equipment passed this information unchanged when no mixing or other processing was being performed.

iv) As an AES/EBU digital audio channel. This would be passed through a spare channel in the audio path of the studio equipment. It would be necessary to ensure that switching of that particular audio channel would be performed along with the video switching, even though the main audio channel(s) might be switched independently of the video.

In addition to forming an appropriate transport method for the Information Stream, the Information stream channel adapter can optionally perform any or all of the following three further operations:

i) Scrambling of the Information Stream, for example by modulo-2 addition to a known pseudo random binary sequence, or by using a self-synchronising scrambler. This may be necessary to limit the visibility of the Information Stream if it is carried in the least significant bits of a video signal. A seed for the pseudo random sequence, or even the sequence itself, may be transmitted as part of the Information Stream.

ii) Error correction of the Information Stream using any known algorithm. This could include repetition of the picture-rate information in several places in the picture so that spatially limited processing, such as caption insertion, would not cause loss of that information.

iii) Modifying the video signal itself by a known noise shaping algorithm such as dynamic rounding or error feedback, to reduce further any residual visibility of the Information Stream in the case where it is carried in the video signal. For example, if the Information Stream is carried in the 8th luminance bit, the error incurred in replacing the original 8th luminance bit by the Information Stream bit can be delayed by one clock period—or passed through some more complex noise shaping network—and added back into the signal. A full description of the error feedback process is given in, for example, Mitra & Kaiser, *Handbook for Digital Signal Processing,* Wiley, 1993, p.421.

Figure 3:
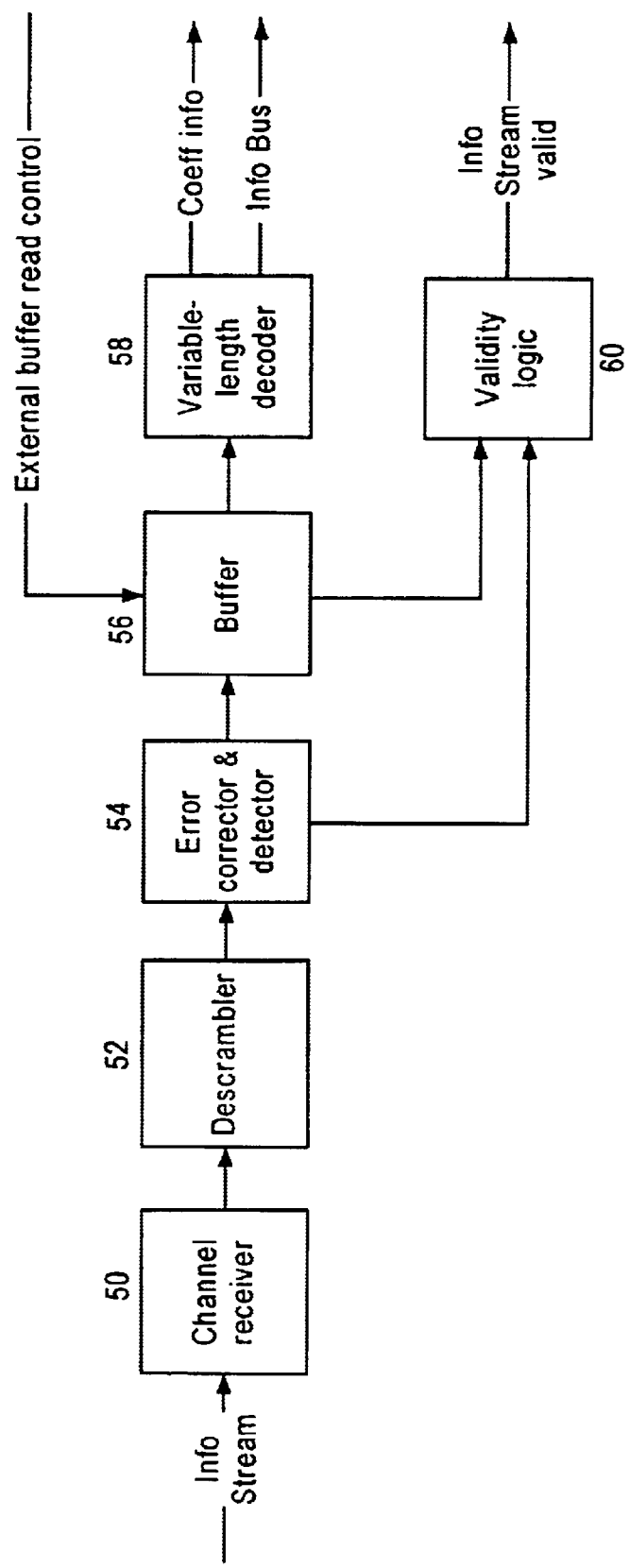
FIG. 3 is a block diagram of an Information Stream decoder.

There is shown in FIG. 3, an Information Stream decoder which performs the inverse of the channel adaptation, formatting and coding functions to produce an Information Bus, and which provides an indication to the Information Bus switch as to the validity or otherwise of the Information Stream. In more detail, the Information Stream decoder comprises a channel receiver 50, which passes a signal to, in turn, a descrambler 52 and an error corrector and detector unit 54. The descrambled and error corrected signal passes through buffer 56 to a variable length decoder 58 which outputs coefficient information and the Information Bus. A validity logic unit 60 receives inputs from the error corrector and detector unit 54 and the buffer 56 and provides an "Information Stream Valid" flag. This controls the Information Bus switch 28.

The Information Stream will be invalid in the case of:
(i) an error in the received Information Stream signal (detected by the error corrector and detector unit 54), which will indicate—for example—that a DVE is affecting the video signal and that the Information Bus calculated by the new MPEG coder front end must be used;
(ii) unavailability of the decoded Information Stream signal at the required time, which indicates that the Information Stream has been lost in the DVE, even if the video to which it refers has been passed untouched (this can occur if the Information Stream and the video signal are not co-timed);
(iii) in the case of an Information Stream which is co-timed with the video signal, the fact that the Information Stream appears to be valid but contains motion vectors which point to macro-blocks in reference pictures which are unavailable.

In some implementations, it is the task of the Information Stream decoder to ensure that the Information Bus at its output is co-timed with the Information Bus at the output of the MPEG coder front end. This can be done by making use of the fact that the Information Stream is an MPEG-compliant signal which requires a buffer and conventional MPEG decoding technology to decode it. The buffer can be used as a delay device, controlled by an external read signal, to ensure that the two Information Buses are synchronous.

The Information Bus switch 28 selects between the Information Bus decoded from the Information Stream and the newly calculated Information Bus from the coder front-end. In its simplest form, it uses the validity signal generated by the Information Stream decoder to control the switch. More complicated options are possible, for example, selection between the two Information Buses on a spatial basis according to the presence or absence of a caption inserted by the DVE. This is particularly appropriate if the Information Stream has been formatted in such a way as to co-time it with the picture signal on a macroblock basis.

In the specific description so far, the decoded Information Stream has been assumed to be an Information Bus, providing coding decisions to the dumb coder whenever it is valid. However, as already mentioned, the Information Stream could in fact contain the whole bitstream, or at least some information about DCT coefficients as well as the coding decisions. If this is the case, the dumb coder would contain some additional processing to make use of the coefficient information. This might be beneficial, for example in the case of the dumb coder producing a bit-rate that is different from that of the original MPEG bitstream.

The Information Stream can be used advantageously whenever there is a need to pass a decoded MPEG signal through any processing that is ultimately followed by a subsequent re-encoding operation. FIG. 1 has already shown a typical application. It should be noted that the MPEG decoder shown on the left of FIG. 1 could be a conventional decoder into which the MPEG bitstream is 'pushed' from a network or transmission channel, or it could be a decoder which 'pulls' information from a network or storage medium under its own timing control, as in an MPEG-based server station.

Within a studio installation, it is not always necessary to re-create a coded MPEG signal between processes that work on the decoded digital video signal. It is sufficient to pass the signal together with the Information Stream through the studio and only to re-encode to MPEG at the final studio output, using an Information Stream based coder as described above. Wherever the Information Stream has passed through all the studio processing unscathed, it will provide the Information Bus for the final encoding operation. Otherwise, the final encoder ignores the Information Stream and codes the picture from scratch, Note that the present invention and the Information Stream concept are not confined to MPEG compression. It could be used with any compression technique, or even with a mixture, although in this case the processing of the decoded Information Stream would be significantly more complicated, as it would involve the re-interpretation of coding mode information for a different compression scheme.

It should be understood that this invention has been described by way of examples only and a variety of further modifications are possible without departing from the scope of the invention.

What is claimed is:

1. A video signal process wherein a video signal is compression encoded to provide a compression encoded signal and wherein a compression encoded signal is compression decoded to provide a compression decoded video signal, characterised in that the compression decoded video signal is modified to carry at least a portion of the compression encoded signal.

2. A video signal process wherein a video signal is compression encoded to provide a compression encoded signal and wherein a compression encoded signal is compression decoded to provide a video signal, wherein an information signal carrying information for use in downstream re-encoding of the video signal accompanies the video signal and process according to claim 1, wherein said information signal is transported alongside said video signal as a digital audio channel.

3. A process according to claim 2, wherein said signal is error corrected.

4. A process according to claim 1, wherein said portion of the compression encoded signal is MPEG compliant.

5. A process according to claim 1, wherein said portion of the compression encoded signal is the MPEG bitstream itself.

6. A process according to claim 5, wherein said portion of the compression encoded signal is the MPEG bitstream in the form of an Elementary Stream.

7. A process according to claim 5, wherein said portion of the compression encoded signal is the MPEG bitstream in the form of a Packetized Elementary Stream.

8. A process according to claim 1, wherein said portion of the compression encoded signal is the MPEG bitstream modified by removing DCT coefficients in order to limit the bit-rate to the capacity of the chosen transport method.

9. A process according to claim 1, wherein said portion of the compression encoded signal is the MPEG bitstream modified by removing all DCT coefficients.

10. A process according to claim 1, wherein said portion of the compression encoded signal is the MPEG bitstream modified by altering DCT coefficients in order to limit the bit-rate to the capacity of the chosen transport method.

11. A process according to claim 1, wherein said portion of the compression encoded signal is re-ordered from bitstream order to display order and time-shifted so that that part of said portion of the compression encoded signal which corresponds with a picture is carried by that part of the compression decoded video signal which corresponds with that picture.

12. A process according to claim 11, wherein each picture is divided into macroblocks and that part of said portion of the compression encoded signal which corresponds with a macroblock is carried by that part of the compression decoded video signal which corresponds with that macroblock.

13. A process according to claim 1, wherein the compression decoded video signal is modified to carry at least a portion of the compression encoded signal by modulating at least one less significant digital element of said video signal.

14. A process according to claim 13, wherein said less significant digital element comprises the least significant bit of the colour-difference part of a 10-bit video signal.

15. A process according to claim 1, wherein said portion of the compression encoded video signal is processed to reduce visibility in the video signal.

16. A process according to claim 15, wherein said portion of the compression encoded video signal is scrambled.

17. A process according to claim 16, wherein said scrambling comprises addition of a known pseudo random sequence.

18. A process according to claim 17, wherein a seed for the pseudo random sequence or the sequence itself is transmitted with said signal.

19. A process according to claim 16, wherein said scrambling comprises the use of a self-synchronising scrambler.

20. A process according to claim 15, wherein said signal is processed by a noise shaping algorithm.

21. A process according to claim 1, wherein said portion of the compression encoded signal is error corrected.

22. A video signal process wherein a video signal is compression encoded to provide a compression encoded signal and wherein a compression encoded signal is compression decoded to provide a video signal, wherein an information signal carrying information for use in downstream re-encoding of the video signal accompanies the video signal and wherein said information signal is transported in an ancillary data channel of the video signal.

23. A process according to claim 22, wherein said signal is error corrected.

24. A process according to claim 22, wherein said information signal is carried in the blanking periods of the video signal.

* * * * *

UNITED STATES PATENT AND TRADEMARK OFFICE
CERTIFICATE OF CORRECTION

PATENT NO.   : 6,674,802 B2
DATED        : January 6, 2004
INVENTOR(S)  : Michael James Knee et al.

It is certified that error appears in the above-identified patent and that said Letters Patent is hereby corrected as shown below:

Title page,
Figure 1, under the number 18, in the box, change the word "Dumo" to -- Dumb --

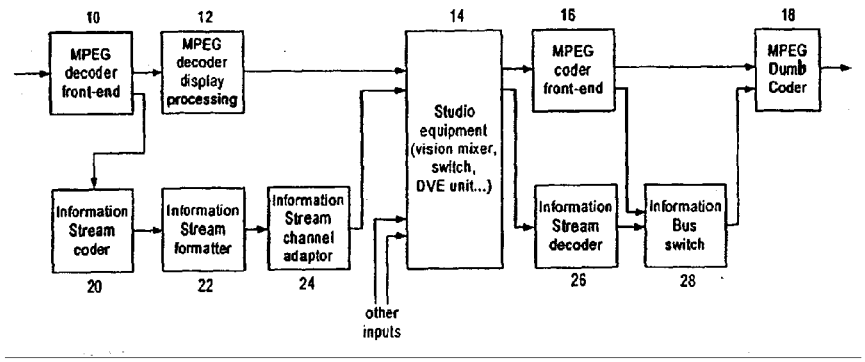

Signed and Sealed this

Twentieth Day of April, 2004

JON W. DUDAS
*Acting Director of the United States Patent and Trademark Office*